United States Patent
Huang et al.

(10) Patent No.: US 8,074,942 B2
(45) Date of Patent: Dec. 13, 2011

(54) MOUNTING APPARATUS FOR STORAGE DEVICE

(75) Inventors: Bin Huang, Shenzhen (CN); Ding-Fang Li, Shenzhen (CN); Chun-Chi Liang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1380 days.

(21) Appl. No.: 11/560,844

(22) Filed: Nov. 17, 2006

(65) Prior Publication Data
US 2007/0194197 A1    Aug. 23, 2007

(30) Foreign Application Priority Data
Feb. 23, 2006    (CN) ...................... 2006 2 0055461 U

(51) Int. Cl.
*H05K 7/00*    (2006.01)

(52) U.S. Cl. .................. 248/27.1; 248/510; 361/679.33

(58) Field of Classification Search ................... 248/505, 248/510, 222.11, 225.11, 694, 27.1; 361/679.02, 361/679.31, 679.33, 683–685, 694, 695, 361/679, 697
See application file for complete search history.

(56) References Cited

U.S. PATENT DOCUMENTS

| | | | | |
|---|---|---|---|---|
| 6,813,148 B2* | 11/2004 | Hsu et al. | ................. | 361/679.39 |
| 6,969,131 B2* | 11/2005 | Chen et al. | ................. | 312/223.2 |
| 7,016,197 B2* | 3/2006 | Kirner | ............................ | 361/752 |
| 7,450,376 B2* | 11/2008 | Chen et al. | ............... | 361/679.33 |
| 7,483,267 B2* | 1/2009 | Chen et al. | ............... | 361/679.31 |
| 2009/0034185 A1* | 2/2009 | Li | .................................. | 361/685 |

* cited by examiner

*Primary Examiner* — Terrell McKinnon
*Assistant Examiner* — Steven Marsh
(74) *Attorney, Agent, or Firm* — Altis Law Group, Inc.

(57) ABSTRACT

A mounting apparatus includes a bracket for receiving a storage device, and a latching member. The bracket includes a sidewall, and a top wall perpendicular to the sidewall. The latching member includes a main body pivotably fixed to the sidewall of the bracket, and a latching portion retainable on the top wall of the bracket. The main body forms two pins to extend through the bracket for fixing the storage device.

8 Claims, 4 Drawing Sheets

MOUNTING APPARATUS FOR STORAGE DEVICE

BACKGROUND OF THE INVENTION

1. Field of the Invention

The present invention relates to mounting apparatuses, and more particularly to a mounting apparatus for a storage device.

2. Description of Related Art

An electronic apparatus, such as a typical desktop computer, a tower computer, a server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is always labor-intensive.

The installation of a hard disk drive in a computer typically involves the use of screws to attach the hard disk drive to a bracket of a computer chassis. However, these screws are usually too small and difficult to handle. Additionally, because of their small size, the screws are easily dropped, by an assembler, into the computer.

To address the aforementioned problems, a plurality of mounting apparatuses is invented to reduce the number of needed screws. For example, a pair of detachable rails is attached to opposite sides of a storage device with screws. The storage device is then slid into and secured to a drive bracket. However, the screws have to be removed to detach the rails from the storage device before replacing the storage device.

What is needed, therefore, is a mounting apparatus which facilitates convenient and secure mounting of a storage device in a bracket.

SUMMARY OF THE INVENTION

An exemplary mounting apparatus includes a bracket for receiving a storage device, and a latching member. The bracket includes a sidewall, and a top wall perpendicular to the sidewall. The latching member includes a main body pivotably fixed to the sidewall of the bracket, and a latching portion retainable on the top wall of the bracket. The main body forms two pins to extend through the bracket for fixing the storage device.

Other advantages and novel features will become more apparent from the following detailed description of preferred embodiment when taken in conjunction with the accompanying drawings, in which:

DETAILED DESCRIPTION OF THE INVENTION

Figure 1:
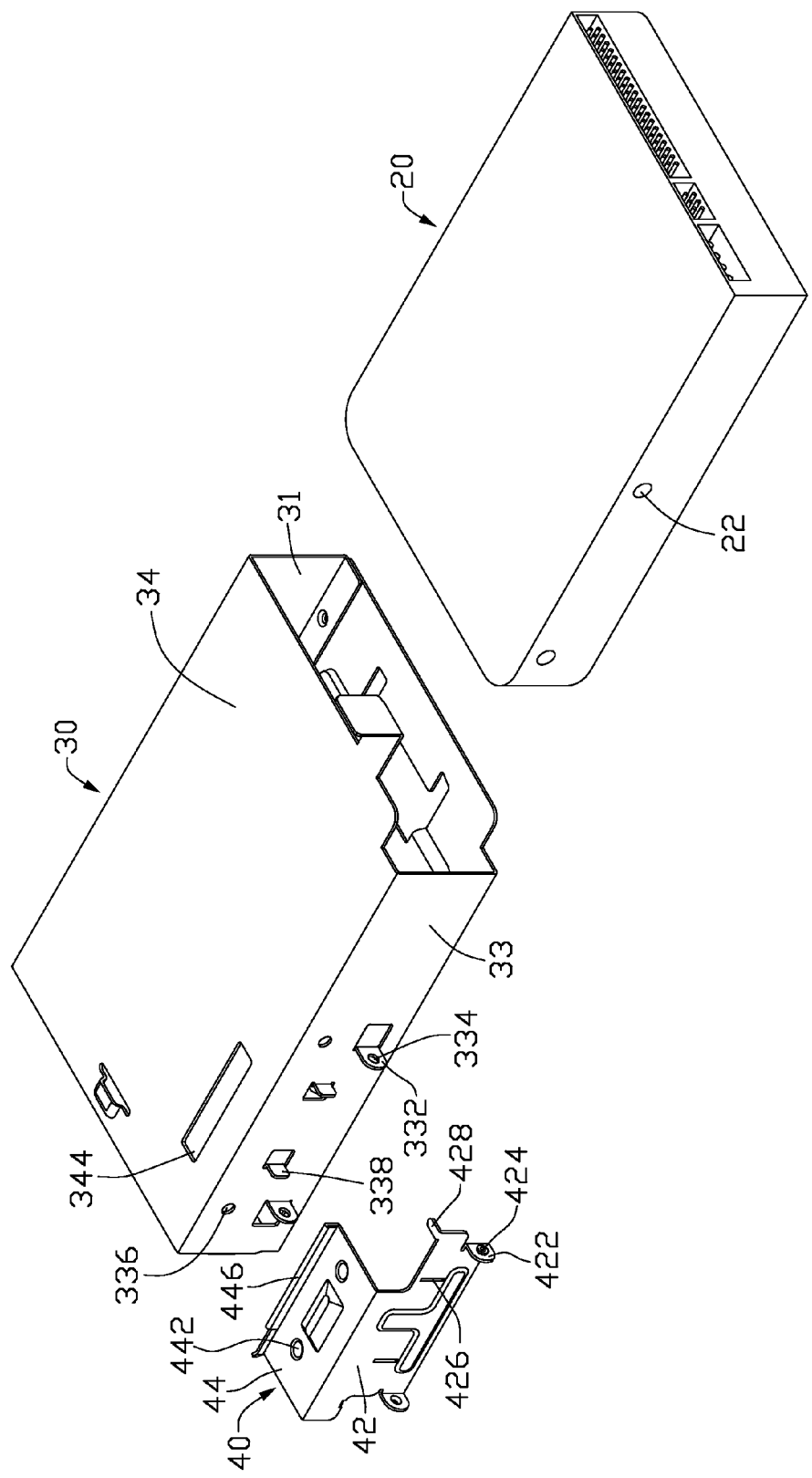
FIG. 1 is an exploded, isometric view of a mounting apparatus with a storage device in accordance with a preferred embodiment of the present invention, the mounting apparatus including a bracket, and a latching member.

Referring to FIG. 1, a mounting apparatus for a storage device is provided in accordance with a preferred embodiment of the present invention. The mounting apparatus includes a bracket 30 for receiving a storage device 20, and a latching member 40 for fixing the storage device 20 to the bracket 30. The storage device 20 defines a pair of fixing holes 22 in a lateral side thereof.

Figure 3:
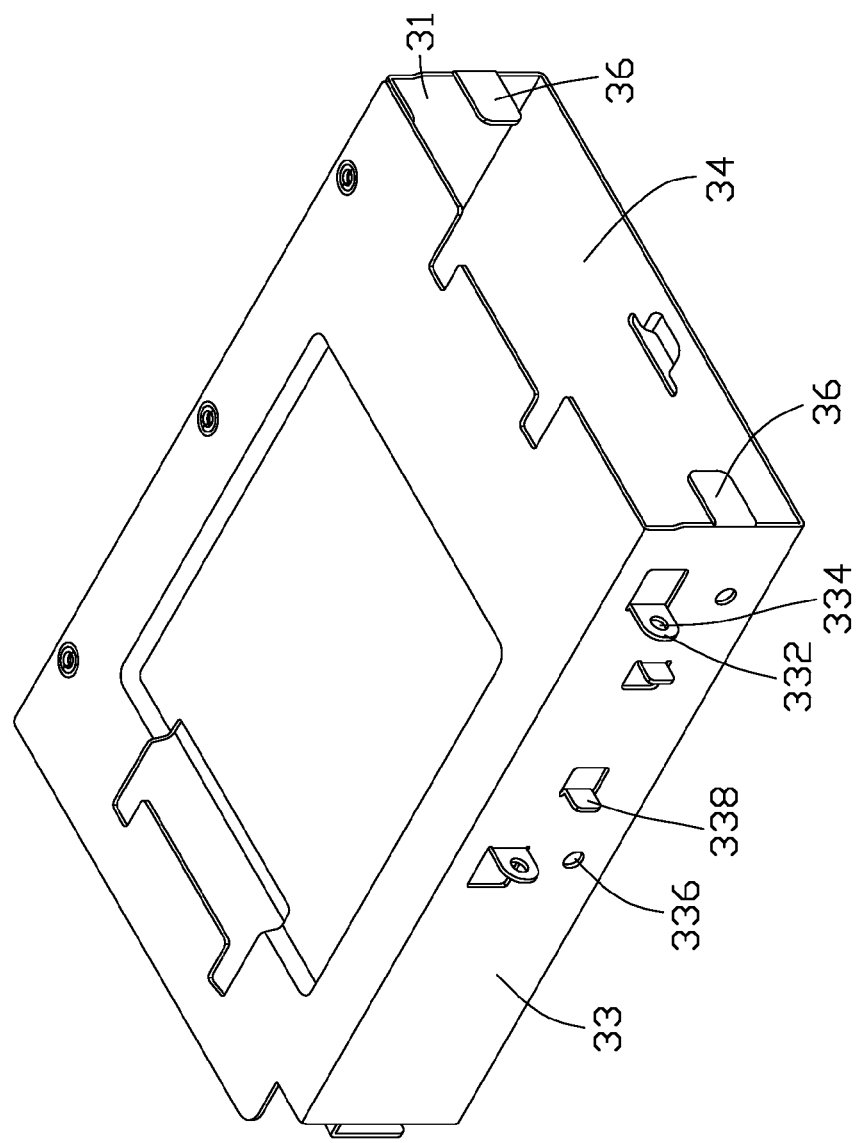
FIG. 3 is an enlarged isometric view of the bracket of FIG. 1, but viewed from another aspect.

Referring also to FIG. 3, the bracket 30 includes a first sidewall 31, a second sidewall 33, and a top wall 34 connecting with the first and second sidewalls 31, 33. Two openings are defined in two ends of the bracket 30 respectively. One of the openings acts as an entrance for the storage device 20 entering the bracket 30, and two opposite stop plates 36 are formed on ends of the first sidewall 31 and the second sidewall 33 respectively adjoining the other one of the openings. A pair of through holes 336 are defined in the second sidewall 33, corresponding to the fixing holes 22 of the storage device. Two spaced tabs 338 are punched outward from the second sidewall 33 substantially between the through holes 336. Two spaced fixing portions 332 protrude perpendicularly outward from the second sidewall 33 below the through holes 336, and each fixing portion 332 defines a pivot hole 334 therein. An aperture 344 (see FIG. 1) is defined in the top wall 34 adjacent the through holes 336 of the second sidewall 33.

Figure 2:
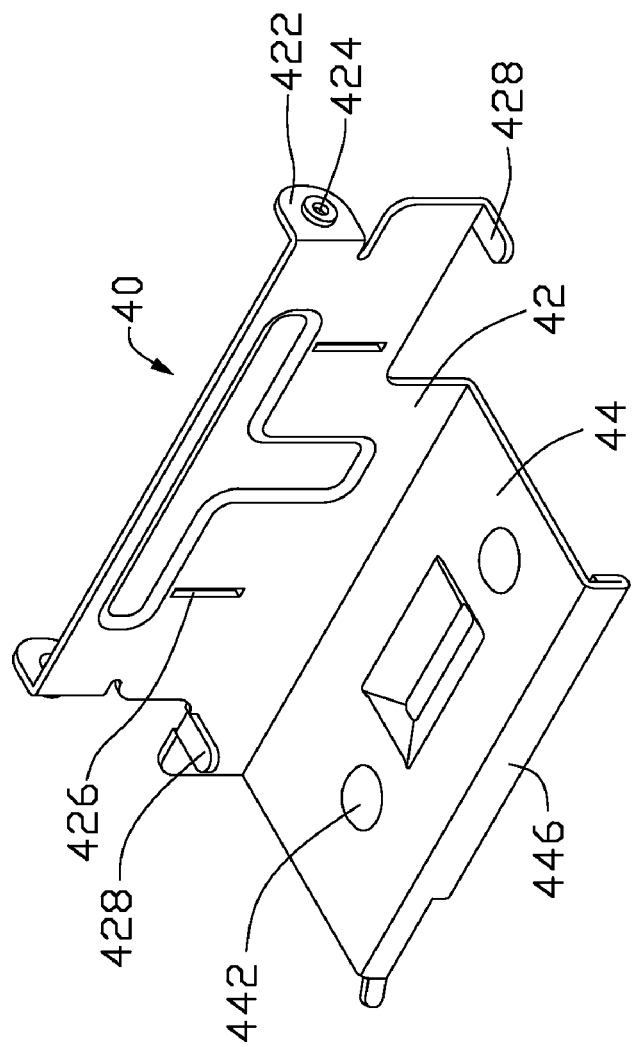
FIG. 2 is an enlarged isometric view of the latching member of FIG. 1, but viewed from another aspect.

Referring also to FIG. 2, the latching member 40 includes a main body 42, and a latching portion 44 extending perpendicularly inward from one end of the main body 42. Two pivot portions 422 extend perpendicularly outward from two lateral surfaces of the main body 42 adjacent the other end thereof, and a pivot 424 protrudes outward from each pivot portion 422. Two slots 426 are defined in the main body 42 corresponding to the tabs 338 of the second sidewall 33 of the bracket 30. Two pins 428 extend perpendicularly inward from the main body 42 corresponding to the through holes 336 of the second sidewall 33. Two dome-shaped protrusions acting as blocks 442 are formed on an inside surface of the latching portion 44. An operating portion 446 is bent outward from the latching portion 44.

Figure 4:
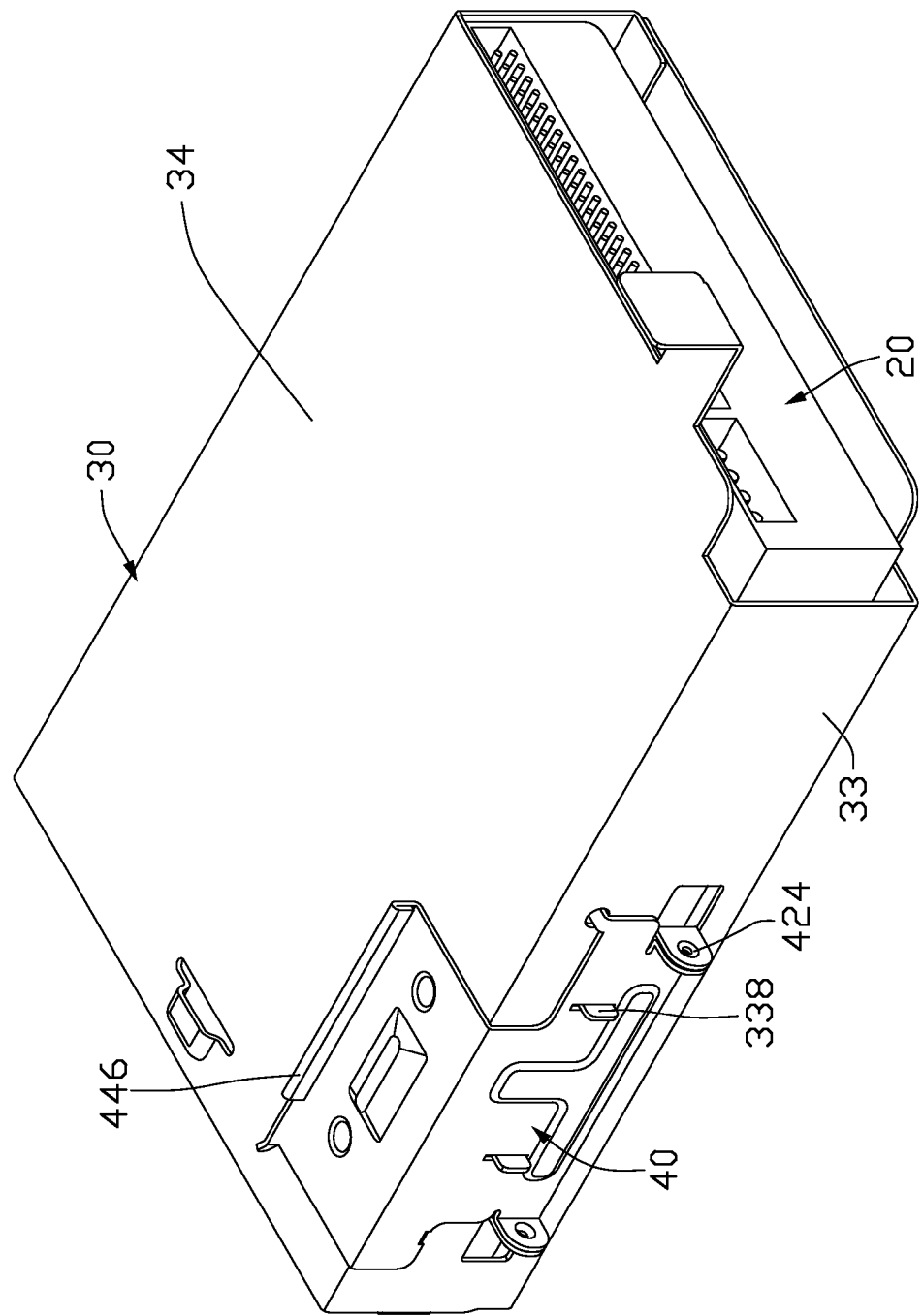
FIG. 4 is an assembled view of FIG. 1.

Referring further to FIG. 4, in assembly, the pivot portions 422 of the latching member 40 are positioned between the fixing portions 332 of the second sidewall 33 of the bracket 30, and the pivots 424 of the pivot portions 422 engage in the pivot holes 334 of the fixing portions 332 respectively. The latching member 40 is thus pivotably fixed to the bracket 30 and is pivotable relative to the bracket 30 between an unlocked position and a locked position.

In use, the latching member 40 is pivoted to the unlocked position, the storage device 20 is installed into the bracket 30 from the entrance thereof. When an end of the storage device 20 abuts against the stop plates 36 of the bracket 30, the fixing holes 22 of the storage device 20 align with the through holes 336 of the second sidewall 33 of the bracket 30 respectively. The latching member 40 is rotated toward the bracket 30, the tabs 338 of the second sidewall 33 of the bracket 30 engage in the slots 426 of the latching member 40 respectively, and the pins 428 of the latching member 40 are extended through the through holes 336 of the second sidewall 33 and engage in the fixing holes 22 of the storage device 20 respectively. The blocks 442 of the latching portion 44 of the latching member 40 engage in the aperture 344 of the top wall 34 of the bracket 30, for retaining the latching member 40 on the bracket 30. The storage device 20 is thus fixed to the bracket 30 at the locked position.

To detach the storage device 20 from the bracket 30, the operating portion 446 of the latching member 40 is pulled up, and the blocks 442 of the latching member 40 are disengaged from the aperture 344 of the top wall 34 of the bracket 30. The latching member 40 is rotated relative to the bracket 30 to the unlocked position. The pins 428 of the latching member 40 are disengaged from the fixing holes 22 of the storage device 20 and withdrawn from the through holes 336 of the bracket 30. The tabs 338 of the second sidewall 33 of the bracket 30 are disengaged from the slots 426 of the latching member 40. The storage device 20 is ready to be detached from the bracket 30.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A mounting apparatus for a storage device, the mounting apparatus comprising:
   a bracket for receiving the storage device, the bracket comprising a first sidewall, a second sidewall, and a third wall connecting with the first sidewall and the second sidewall, the first sidewall defining two through holes therein; and
   a latching member installable to the bracket, the latching member comprising a main body and a latching portion integral with the main body, the main body forming two pins to extend through the through holes of the bracket for engaging in a pair of fixing holes of the storage device, the latching portion configured to engage with a component of the mounting apparatus other than the first sidewall of the bracket for retaining the latching member on the bracket.

2. The mounting apparatus as claimed in claim 1, wherein the component is the third wall, the third wall has an aperture defined therein, the latching portion extends perpendicularly from an end of the main body, and a block is formed on the latching portion for engaging in the aperture.

3. The mounting apparatus as claimed in claim 2, wherein two spaced fixing portions protrude outward from the first sidewall of the bracket, each of the fixing portions defines a pivot hole, two pivot portions extend perpendicularly from the main body adjacent another end thereof, and each of the pivot portions forms a pivot for engaging in the corresponding pivot hole.

4. The mounting apparatus as claimed in claim 1, wherein two slots are defined in the main body of the latching member, and two spaced tabs extend outwardly from the first sidewall of the bracket for engaging in the corresponding slots.

5. The mounting apparatus as claimed in claim 1, wherein an operating portion is bent outward from the latching portion of the latching member.

6. The mounting apparatus as claimed in claim 1, wherein two openings are defined in two ends of the bracket respectively, and two opposite stop plates are formed on the bracket adjoining one of the openings, for abutting against the storage device.

7. A mounting apparatus for a storage device, the mounting apparatus comprising:
   a bracket for receiving the storage device, the bracket comprising a sidewall and a top wall perpendicular to the sidewall; and
   a latching member comprising a main body pivotably fixed to the sidewall of the bracket, and a latching portion configured to be retainable on the top wall of the bracket, the main body forming a pin to extend through the bracket for engaging in a fixing hole of the storage device;
   wherein the top wall of the bracket has an aperture defined therein, the latching portion extends from an end of the main body, and a block is formed on the latching portion for engaging in the aperture; and
   wherein two spaced fixing portions protrude outwardly from the sidewall of the bracket, and each of the fixing portions defines a pivot hole, two pivot portions extend perpendicularly from the main body adjacent the other end thereof, and each of the pivot portions forms a pivot for engaging in the pivot hole of a corresponding fixing portion.

8. A mounting apparatus for a storage device, the mounting apparatus comprising:
   a bracket for receiving the storage device, the bracket comprising a sidewall and a top wall perpendicular to the sidewall, the top wall comprising an aperture, the sidewall comprising two spaced fixing portions protruded outwardly from the sidewall of the bracket, each fixing portion comprising a pivot hole; and
   a latching member comprising a main body pivotably fixed to the sidewall of the bracket, a latching portion extending from one end of the main body, and two pivot portions extend perpendicularly from the main body adjacent the other end, the latching portion forming a block for engaging in the aperture configured to be retainable on the top wall of the bracket, each pivot portion forming a pivot for engaging in the pivot hole of a corresponding fixing portion, the main body forming a pin to extend through the bracket for engaging in a fixing hole of the storage device.

* * * * *